March 25, 1969     C. A. DEHNE     3,434,431
STOP FOR CONVEYOR CARRIERS

Filed Dec. 27, 1965

INVENTOR.
CLARENCE A. DEHNE
BY
Farley, Forster & Farley
ATTORNEYS

United States Patent Office 3,434,431
Patented Mar. 25, 1969

3,434,431
STOP FOR CONVEYOR CARRIERS
Clarence A. Dehne, Orchard Lake, Mich., assignor to Jervis B. Webb Company, a corporation of Michigan
Filed Dec. 27, 1965, Ser. No. 516,305
Int. Cl. B61b 13/00
U.S. Cl. 104—172    9 Claims

ABSTRACT OF THE DISCLOSURE

A device for stopping a conveyor carrier equipped with a driving dog movable to a nondriving position by a driving dog releasing member, comprising a first stop member which engages and moves the driving dog to nondriving position and another stop member which may be abutted by the driving dog, or in an alternate form by the dog releasing member, if the driving dog has been moved to nondriving position by the first stop member or alternately by the releasing member.

---

This invention relates to improvements in the construction and arrangement of wayside stopping devices for arresting forward movement of carriers of a power and free conveyor, particularly carriers of the type equipped with driving mechanism including a driving dog and a driving dog releasing member, both movable between driving and nondriving positions relative to a pusher of a propelling member. Carriers of this type are also conventionally equipped with a one-way holdback dog movable to a depressed position when engaged by an overtaking pusher.

One type of wayside stop to which the improvements of the present invention relate is disclosed in U.S. Patent 3,229,645, filed Mar. 12, 1964, and consists of a plate-like stop member which can be moved into the path of travel of the conveyor carrier so as to engage and depress the driving dog thereof to nondriving position and then abut against the forward face of the holdback dog to arrest carrier movement. The holdback dog is made so as to project toward a pusher of the propelling member a distance less than does the driving dog in the driving position of the latter; and, where a stop is installed the spacing between the carrier supporting track and the propelling member is increased so that a pusher will engage the driving dog in the driving position thereof but will not engage the holdback dog.

In some instances, malfunctions have occurred with this prior construction. For example, if for any reason the carrier holdback dog is not in its extended position when the carrier moves into the stop, carrier motion will not be arrested. When at least two carriers have been halted in banked or accumulated relation at a stop and the stop is opened to permit the leading carrier to move on, it is possible for the leading carrier to tow a following carrier through the stop before the stop is returned to blocking position.

The principal object of the present invention is to provide a wayside stop construction incorporating a stop member engageable by some portion of the carrier driving mechanism, which stop member can be employed as a secondary stop in the event of malfunction of a primary stop, or which can alternately be employed as a primary stop to arrest forward movement of a carrier.

According to the invention a wayside stop for a conveyor carrier of the type which is propelled along the supporting track by a pusher of a propelling member engaging driving mechanism on the carrier, such driving mechanism including a driving dog and a releasing member both movable between driving and nondriving positions relative to a pusher, comprises the combination of a first stop member engageable with the driving dog for moving the driving dog to nondriving position, and a second stop member extending into the path of movement of some portion of said mechanism in the nondriving position thereof.

Other features and advantages of the invention will be brought out in the following description of the representative embodiments disclosed in the accompanying drawings in which.

Figure 1:
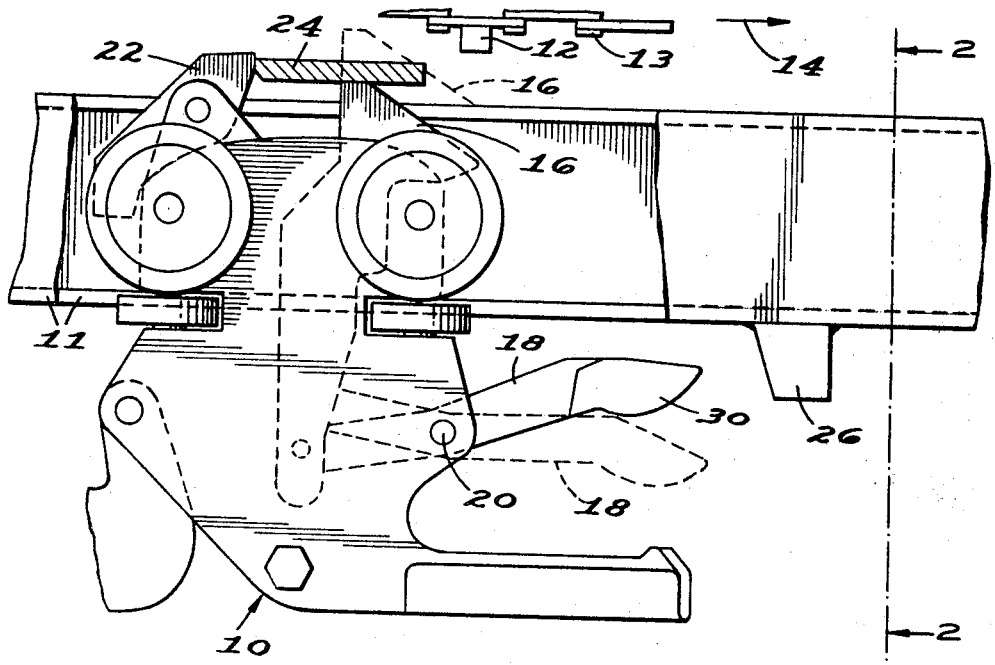
FIGURE 1 is a side elevation of a conveyor carrier of the type under discussion halted by a wayside stop.
Figure 2:
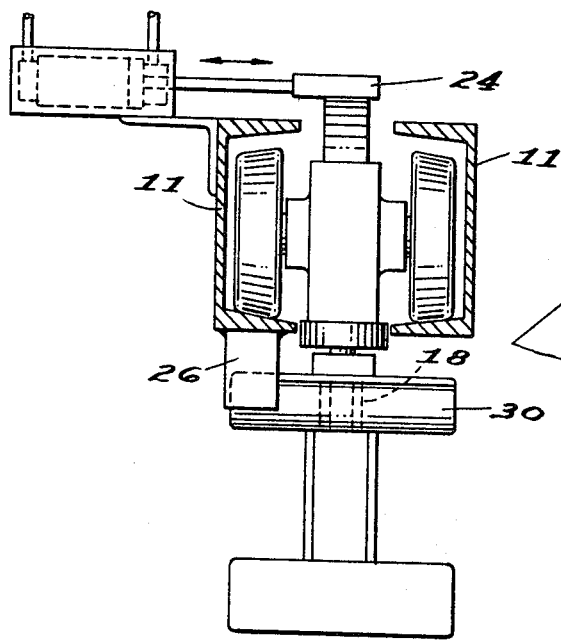
FIGURE 2 is a sectional elevation taken as indicated by the line 2—2 of FIG. 1.

Referring to FIGS. 1 and 2, a carrier 10 is normally propelled along a supporting track 11 by a pusher 12 of a propelling member 13 travelling in the direction of the arrow 14 by engagement between the pusher and driving mechanism on the carrier. Such driving mechanism includes a driving dog 16 connected to a dog releasing member 18 pivoted to the carrier at 20, so that both the driving dog 16 and releasing member 18 are movable between a driving position shown in broken line and a nondriving position shown in full line. A one-way holdback dog 22 is pivoted on the carrier so as to be movable to a depressed position if struck by an overtaking pusher, and in the construction of FIG. 1, the holdback dog projects toward a pusher a distance less than does the driving dog in driving position.

The stop construction of FIGS. 1 and 2 consists in the combination of a first stop member 24 which is engageable with the driving dog 16 for moving the driving mechanism including the driving dog and releasing member 18 to the nondriving position thereof. The stop member 24 is normally engaged by the forward face of the holdback dog 22 to arrest carrier movement. A second stop member 26 is also provided, and is fixed to the lower flange of the supporting track 11 in the path of movement of the wide forward end portion 30 of the releasing member 18 while the latter is held in nondriving position by action of the first stop member 24. If for any reason the carrier is not halted by the holdback dog 22 engaging the first stop member 24, the releasing member 18 will abut against the second stop member 26. The second stop member 26 clears the carrier driving mechanism in the driving position thereof.

Figure 3:
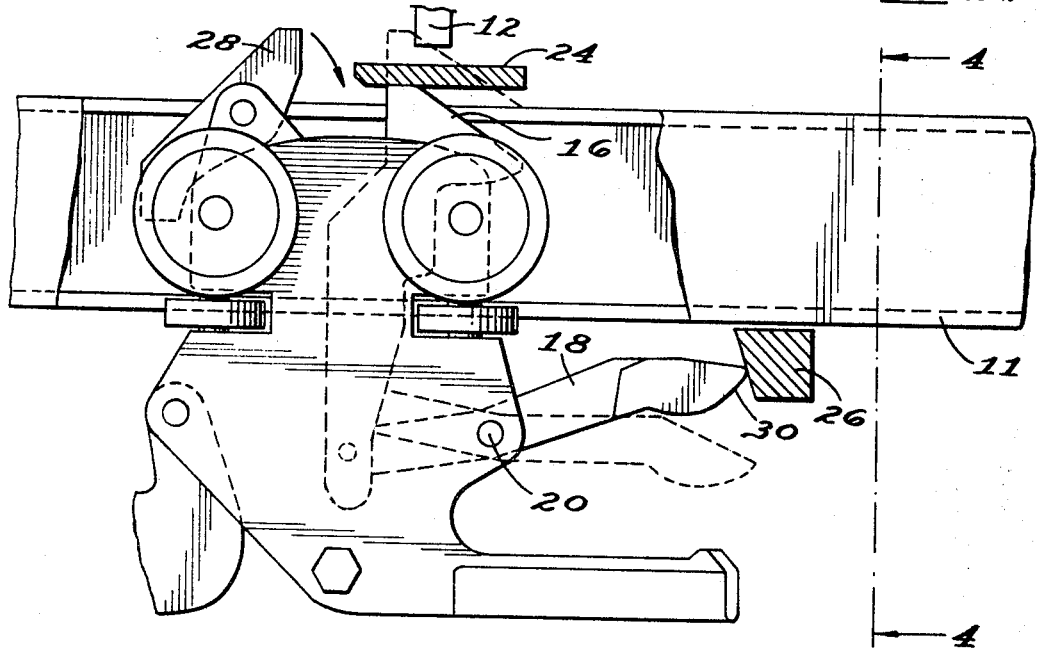
FIGURE 3 is a side elevation similar to FIG. 1 showing an alternate arrangement of the members comprising the wayside stop.
Figure 4:
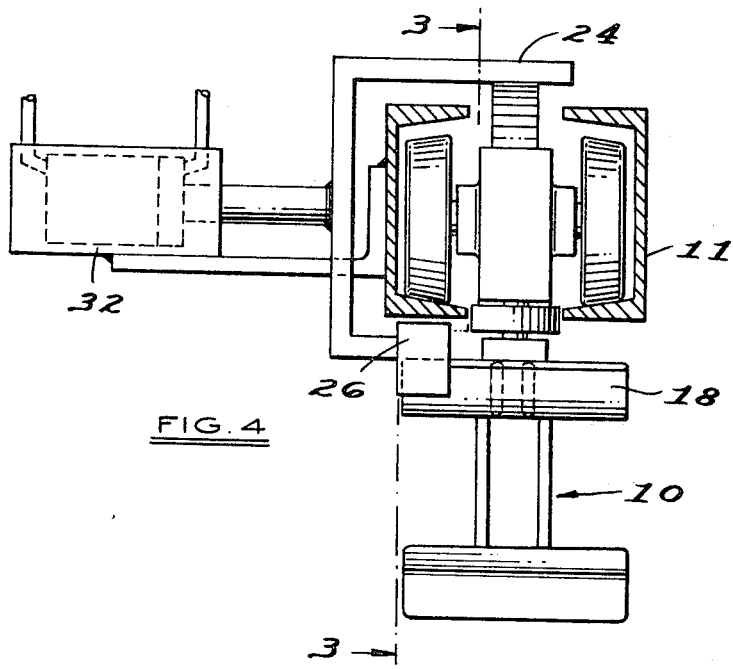
FIGURE 4 is an elevation taken on the line 4—4 of FIG. 3 including a schematic showing of means for moving the members of the stop between operative and inoperative positions with respect to a carrier.

FIGS. 3 and 4 show an alternate arrangement of the first and second stop members 24 and 26, and in this construction all parts of the carrier are similar to those previously described except the holdback dog 28, which projects the same distance towards a pusher 12 as does the driving dog 16 in a driving position.

In this construction the spacing between the first and second stop members 24 and 26 longitudinally of the track 11 is reduced in comparison to that employed in the construction of FIGS. 1 and 2. The first stop member engages and moves the driving dog 16 and releasing member 18 to the nondriving position shown in full line in which the forward end 30 of the releasing member abuts against the second stop member 26 and halts the carrier in a position such that the holdback dog 28 is free to pivot to depressed position if struck by a passing pusher 12.

If desired, the second stop member 26 may be moved in unison with the first stop member 24 between operative and inoperative positions relative to the carrier drive mechanism by suitable electrically or fluid pressure actuated means 32 shown in FIG. 4.

Figure 5:
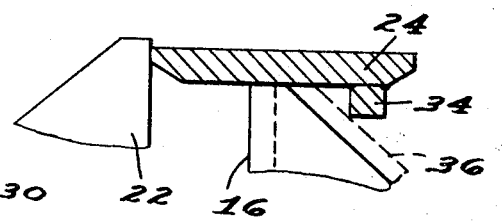
FIGURE 5 is a fragmentary side elevation similar to FIGS. 1 and 3 showing a further alternate arrangement of the members of the stop.

In the construction of FIG. 5 the second stop member consists of a bar 34 secured to the first stop member 24 in depending relation therewith, and the carrier holdback dog 22 is of the same construction and arrangement as that shown in FIG. 1, being intended to abut against the first stop member 24 to arrest carrier movement. If for any reason this engagement between the first stop member 24 and holdback dog 22 does not take place, further forward movement of the carrier will result in the forward face 36 of the driving dog 16 abutting the secondary stop 34 as shown in broken line. This will result in stopping the carrier because the driving dog 16 cannot move in a releasing direction an amount sufficient to pass under the second stop member 34.

Obviously the bar 34 may be mounted on the member 24 in a position such as to serve as a primary stop, thereby relieving the holdback dog of any stopping function as in the arrangement of FIGS. 3 and 4.

It will be noted that in all arrangements shown and described, the second stop member 26 or 34 extends into the path of movement of some portion of the carrier driving mechanism, either the driving dog 16 or releasing member 18, when this mechanism is in the nondriving position. The second stop member may thus serve as an auxiliary stop in the event the holdback dog 22 fails to engage the first stop member as in the manner intended in the arrangement of FIGS. 1 and 5; or alternately, may serve as a primary stop for the carrier with the holdback dog performing no stopping function as shown in FIG. 3.

While preferred embodiments have been described above in detail, it will be understood that numerous modifications might be resorted to without departing from the scope of the invention as defined in the following claims.

I claim:

1. A wayside stop for a conveyor carrier of the type which is propelled along a supporting track by a pusher of a propelling member engaging driving mechanism on the carrier, said mechanism including a driving dog and a releasing member both movable between driving and nondriving positions relative to a pusher, comprising the combination of a first stop member engageable with the driving dog for moving the driving dog to nondriving position and a second stop member extending into the path of movement of some portion of said driving mechanism in the nondriving position thereof.

2. A wayside stop as claimed in claim 1 wherein the second stop member is mounted on the first stop member and extends into the path of movement of the driving dog portion of said driving mechanism in the nondriving position thereof.

3. A wayside stop as claimed in claim 1 wherein the second stop member is mounted on the carrier supporting track and extends into the path of movement of the releasing member portion of said driving mechanism in the nondriving position thereof.

4. A wayside stop as claimed in claim 3 wherein the second stop member is fixed to the carrier supporting track in depending relation therewith.

5. A wayside stop as claimed in claim 3 wherein the second stop member is movable between operative and inoperative positions relative to said carrier driving mechanism, and means for moving the second stop member.

6. A wayside stop as claimed in claim 1 wherein the carrier is equipped with a holdback dog normally engageable by said first stop member to arrest forward carrier movement, said second stop member being arranged for engagement by the said portion of said driving mechanism in the event the holdback dog is not so engaged by the first stop member.

7. A wayside stop as claimed in claim 1 wherein the carrier is equipped with a one-way holdback dog movable to a depressed position when engaged by an overtaking pusher, said first and second stop members being arranged so that the first stop member engages and moves said driving mechanism to nondriving position, and the second stop member sequentially engages the said portion of said driving mechanism to arrest forward movement of the carrier.

8. A wayside stop as claimed in claim 7 wherein the second stop member is located so as to arrest forward movement of the carrier with the carrier in a position such that the first stop member does not interfere with movement of the holdback dog when engaged by a passing pusher.

9. A stop for a conveyor carrier of the type which is propelled along a supporting track by a pusher of a propelling member engaging a driving dog on the carrier, said driving dog being movable from a driving to a nondriving position relative to the pusher in response to movement of a driving dog releasing member mounted on the carrier; comprising a stop member, and means positioning said stop member in the path of forward movement of said releasing member for abutting engagement thereby when the driving dog is in nondriving position.

References Cited

UNITED STATES PATENTS

| | | | |
|---|---|---|---|
| 2,940,400 | 6/1960 | Harrison | 104—172 X |
| 3,092,038 | 6/1963 | Orwin | 104—178 X |
| 3,347,171 | 10/1967 | Torrance | 104—172 |

ARTHUR A. LA POINT, *Primary Examiner.*

DANIEL F. WORTH III, *Assistant Examiner.*

U.S. Cl. X.R.

104—178